Aug. 23, 1966　　　OSAMU SABURI　　　3,268,783
CAPACITOR COMPRISING AN N-TYPE SEMICONDUCTOR METALLIC
OXIDE AND A LAYER OF COMPENSATED MATERIAL
Filed Oct. 5, 1965

INVENTOR
OSAMU SABURI

BY Wenderoth, Lind & Ponack,

ATTORNEYS

3,268,783
CAPACITOR COMPRISING AN N-TYPE SEMICONDUCTOR METALLIC OXIDE AND A LAYER OF COMPENSATED MATERIAL

Osamu Saburi, Kyoto-fu, Japan, assignor to Murata Manufacturing Co., Ltd., Otokuni-gun, Kyoto-fu, Japan, a corporation of Japan
Filed Oct. 5, 1965, Ser. No. 493,008
5 Claims. (Cl. 317—237)

This application is a continuation-in-part of my application Serial No. 123,054, filed July 10, 1961 which has become abandoned.

This invention relates to ceramic capacitors utilizing dielectric films formed on controlled valency type semiconductor metal oxides by a method in which the controlled valence is compensated by the addition of an element thereto so as to change the semiconductor to a dielectric, and to the methods of manufacturing the said capacitors.

The invention will be understood more fully by reference to the following specification and claims, taken together with the accompanying drawings, in which:

Figure 1:
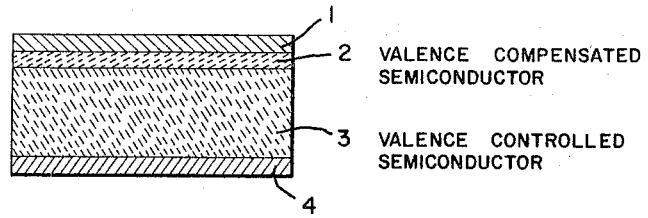
FIG. 1 is a cross sectional view of a capacitor which has one surface which has a valence compensated layer thereon.

It is known that the resistivities of barium-titanates which are usually higher than $10^{11}$ ohm-cm. can be greatly reduced by introducing proper additives. This phenomenon is understood to be caused because the additives cause titanium having a valence of three to be produced from the titanium ions in the titanate. Hence, the semiconductive barium titanates produced by the above treatment are called controlled valency semiconductive barium titanates.

The production of semiconductive ceramic material by this type of valency control can be carried out with all the members of the family of materials which can be generically designated $E^{2+}M^{4+}O_3^{2-}$, one of which is barium titanate, where E is an alkaline earth element material taken from the group consisting of barium, magnesium, calcium, strontium, lead and mixtures thereof, and M is a metal element from the group consisting of titanium, tin, zirconium and solid solutions consisting of at least two of the above mentioned substances, and in which O is oxygen.

As the additives for controlling valence there can be used at least one material A having a valence $a$ greater than 2 and an ionic radius close to that of the material E and taken from the group consisting of yttrium, actinium, thorium, antimony, bismuth, the members of the rare earth elements, and mixtures thereof, or at least one material B having a valence $b$ greater than 4 and an ionic radius close to that of the metal material M and taken from the group consisting of vanadium, niobium, tantalum, selenium, tellurium, tungsten and mixtures thereof. The total quantity of the additive is from 0.01 atomic percent to 0.5 atomic percent of the host material. The additive A is substituted in the alkaline earth material E, and in this case the material E is considered the host material, and the additive B is substituted in the metal material, and in such case the metal material M is considered the host material.

Examples of this manner of controlling valence by the addition of the additive are set forth below Equation A representing the situation where the alkaline earth material E is the host element and Equation B representing the situation where the metal material is the host element.

(A) $E^{2+}M^{4+}O_3^{2-} + xA^{a+}$
$$\rightarrow E_{1-x}^{2+}A_x^{a+}M_{1-(a-2)x}^{4+}M_{(a-2)x}^{3+}O_3^{2-}$$

(B) $E^{2+}M^{4+}O_3^{2-} + xB^{b+}$
$$\rightarrow E^{2+}M_{1-(b-3)x}^{4+}M_{(b-4)x}^{3+}B_x^{b+}O_3^{2-}$$

Where the ceramic material is barium titanate and the additive materials for valence control are lanthanum or tantalum, Equations A and B can be written as follows:

(A′) $Ba^{2+}Ti^{4+}O_3^{2-} + x\mathrm{La}$
$$\rightarrow Ba_{1-x}^{2+}La_x^{3+}Ti_{1-x}^{4+}Ti_x^{3+}O_3^{2-}$$

(B′) $Ba^{2+}Ti^{4+}O_3^{2-} + x\mathrm{Ta}$
$$\rightarrow Ba^{2+}Ti_{1-2x}^{4+}Ti_x^{3+}Ta_x^{5+}O_3^{2-}$$

The Equations A and A′ illustrate the case where some sites of the alkaline earth material, e.g. the barium ions in barium titanate, are occupied by the ions of the additive A having a valance $a$ higher than that of the host ions, so that in the valence controlled material, which can be represented by the right hand side of the equations, a part of the metal, e.g. titanium ions, of valence four change to those of valence three to maintain the electric neutrality of the crystals. The Equations B and B′ illustrate the case where some sites of the metal material ions, e.g. the titanium ions in barium titanate, are occupied by the ions of the additive B having a valence $b$ higher than that of the host ions, so that the valence controlled material, which can be represented by the right hand side of the equations, a part of the metal, e.g. titanium ions, of valence four change to those of valence three to maintain the electric neutrality of the crystals.

Each of three valent metal material, e.g. titanium, ions thus produced consists of a trapped electron and a four valent metal material, e.g. titanium, ion. The trapped electrons can easily move to other metal material, e.g. titanium, ions when excited with a low voltage electric field. The controlled valency type ceramic materials are thus semiconductive due to the available electrons thus produced.

It has now been discovered that this semiconductive material can be made highly dielectric by compensating for the controlled valence by the addition of a compensating material.

As the additives for compensating the controlled valence there can be used at least one material C having a valence $c$ less than the valence of the alkaline earth material E and taken from the group consisting of sodium, potassium, copper, rubidium, silver, cesium, gold, and mixtures thereof or at least one material D having a valence $d$ less than the valence of the metal material and taken from the group consisting of aluminum, scandium, chromium, molybdenum, manganese, iron, cobalt, nickel, magnesium, and mixtures thereof.

Because there are two types of valence controlled material, depending on which of the parts of the original ceramic material acts as the host element, there are four possible ways in which compensation of the semiconductive valence controlled material can be carried out. Where the valence compensating additive has a valence less than the alkaline earth material, it can be substituted in the alkaline earth material E, which is the host element therefor, in the material which has either a valence control additive substituted in the alkaline earth material E or in the metal material M. Equations C and D represent these situations, and can be written as follows:

(C) $E_{1-x}^{2+}A_x^{a+}M_{1-(a-2)x}^{4+}M_{(a-2)x}^{3+}O_3^{2-}$
$+(a-2)xC^{1+} \rightarrow E_{1-(a-1)x}^{2+}A_x^{a+}C_{(a-2)x}^{1+}M^{4+}O_3^{2-}$ (D) $E^{2+}M_{1-(b-3)x}{}^{4+}M_{(b-4)x}{}^{3+}B_x{}^{b+}O_3{}^{2-}+(b-4)xC^{1+} \rightarrow$
$E_{1-(b-4)x}{}^{2+}C_{(b-4)x}{}^{1+}M_{1-x}{}^{4+}B_x{}^{b+}O_3{}^{2-}$ Where the ceramic material is barium titanate and the additive materials for valence control are lanthanum or tantalum, and the valence compensating additive is sodium, Equations C and D can be written as follows:

(C') $Ba_{1-x}{}^{2+}La_x{}^{3+}Ti_{1-x}{}^{4+}Ti_x{}^{3+}O_3{}^{2-}+xNa \rightarrow$
$Ba_{1-2x}{}^{2+}La_x{}^{3+}Na_x{}^{1+}Ti^{4+}O_3{}^{2-}$ (D') $Ba^{2+}Ti_{1-2x}{}^{4+}Ti_x{}^{3+}Ta_x{}^{5+}O_3{}^{2-}+xNa \rightarrow$
$Ba_{1-x}{}^{2+}Na_x{}^{1+}Ti_{1-x}{}^{4+}Ta_x{}^{5+}O_3{}^{2-}$ Where the valence compensating additive has a valence less than the metal material, it can be substituted in the metal material M, which is the host element therefor, in the material which has either a valence control additive substituted in the alkaline earth material E or in the metal material M. Equations E and F represent these situations, and can be written as follows:

(E) $E_{1-x}{}^{2+}A_x{}^{a+}M_{1-(a-2)x}{}^{4+}M_{(a-2)x}{}^{3+}O_3{}^{2-}$
$+(a-2)x/(4-d)D^{d+} \rightarrow$
$E_{1-x}{}^{2+}A_x{}^{a+}M_{1-(a-2)x/(4-d)}{}^{4+}D_{(a-2)x/(4-d)}{}^{d+}O_3{}^{2-}$ (F) $E^{2+}M_{1-(b-3)x}{}^{4+}M_{(b-4)x}{}^{3+}B_x{}^{b+}O_3{}^{2-}$
$+(b-4)x/(4-d)D^{d+} \rightarrow$
$E^{2+}M_{1-(b-d)x/(4-d)}{}^{4+}B_x{}^{b+}D_{(b-4)x/(4-d)}{}^{d+}O_3{}^{2-}$ Where the ceramic material is barium titanate and the additive materials for valence control are lanthanum or tantalum, and the valence compensating additive is aluminum, Equations E and F can be written as follows:

(E') $Ba_{1-x}{}^{2+}La_x{}^{3+}Ti_{1-x}{}^{4+}Ti_x{}^{3+}O_3{}^{2-}+xAl \rightarrow$
$Ba_{1-x}{}^{2+}La_x{}^{3+}Ti_{1-x}{}^{4+}Al_x{}^{3+}O_3{}^{2-}$ (F') $Ba^{2+}Ti_{1-2x}{}^{4+}Ti_x{}^{3+}Ta_x{}^{5+}O_3{}^{2-}+xAl \rightarrow$
$Ba^{2+}Ti_{1-2x}{}^{4+}Ta_x{}^{5+}Al_x{}^{3+}O_3{}^{2-}$ The foregoing equations show that the controlled valence material is compensated when ions of a material having a valence lower than either the alkaline earth material, such as barium, are substituted for a part of the alkaline earth material, or when ions of a material having a valence lower than that of the metal material, such as titanium, are substituted for a part of the metal material.

When the materials have had their controlled valence compensated, they turn from semiconductors to insulating dielectrics because they no longer have available free electrons. It follows that in order to achieve this state the amount of valence compensating additive material C or D which is added must correspond to the amount of valence control additive material A or B which has been added to make the material semiconductive in the first place. For example, when the valence of material A is three and the valence of material C is one in Equation C, the amount of valence compensation additive is the same as the amount of valence control additive; when the valence of material A is four and the valence of material C is one in Equation C, the amount of valence compensation additive is twice of the amount of valence control additive; when the valence of material A is three and the valence of material D is two in Equation E, the amount of valence compensation additive is one half of the amount of valence control additive. As the amount of valence control additive ranges from 0.01 atomic percent to 0.5 atomic percent, the amount of valence compensation additive thus ranges from 0.005 atomic percent to 1.0 atomic percent.

The electric properties of the compensated material are similar to those of the usual barium titanate ceramics, as they have high dielectric strength and a dielectric constant as high as one to ten thousand.

A practical use of this valence compensated material is in the making of capacitors. A thin insulating layer of, for example, valence compensated, barium titanate is formed on a valence controlled semiconductive barium titanates, when a compound containing at least one of the above mentioned valence compensating elements is placed on the surface of the semiconductive barium titanates by an appropriate method, such as coating, plating, vaporizing, spraying, or electrolytically, and then the semiconductive body is fired at a temperature of from 700° C. to 1300° C.

Figure 2:
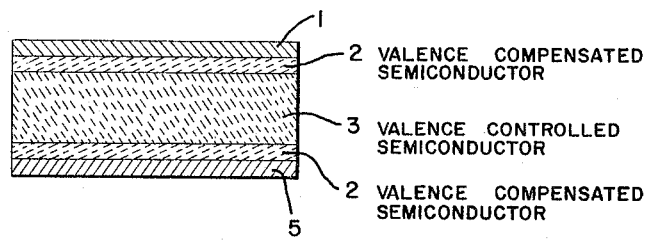
FIG. 2 is a view similar to FIG. 1 of a capacitor having opposite surfaces which have valence compensated layers thereon.

FIG. 1 shows a semiconductive plate 3 which has one surface thereof treated by the above method to form a layer 2 of valence compensated material, and FIG. 2 shows a semiconductive plate 3 which has both surfaces treated to form valence compensated layers 2. Electrodes 1, 4 and 5 in FIGS. 1 and 2 are applied by conventional methods of firing, brushing, sputtering, or spraying.

If the resisitivity of the semiconductive body is sufficiently low, the device shown in FIG. 1 works as a capacitor consisting of a thin ceramic film of high dielectric constant. And the device shown in FIG. 2 works as two capacitors which are series connected. The thickness of the thin film of compensated barium titanate can be controlled by controlling the quantity of the valence compensating compound applied to the surface of the body when the valence compensating method is carried out.

Capacitors whose capacity is more than 0.15 microfarad/cm.$^2$ can be produced when the thickness of the film is 10 microns and the dielectric constant of the film is 2,000. This capacity is twenty times that of conventional ceramic capacitors.

Figure 3:
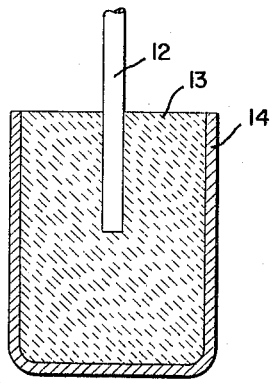
FIG. 3 is a sectional view of a specific form of a capacitor body having a valence compensated layer on the outer surface thereof.

Much higher capacity per unit volume is obtainable with the form of capacitor shown in FIG. 3. In FIG. 3, the element 13 denotes a porous semiconductive titanate which is treated by the valence compensation method of the present invention; 12 denotes an inner lead which is ohmically connected to the porous semiconductive titanate, and 14 denotes the outer can which forms an outer electrode connected to the treated surface of the semiconductive barium titanate.

Figure 4:
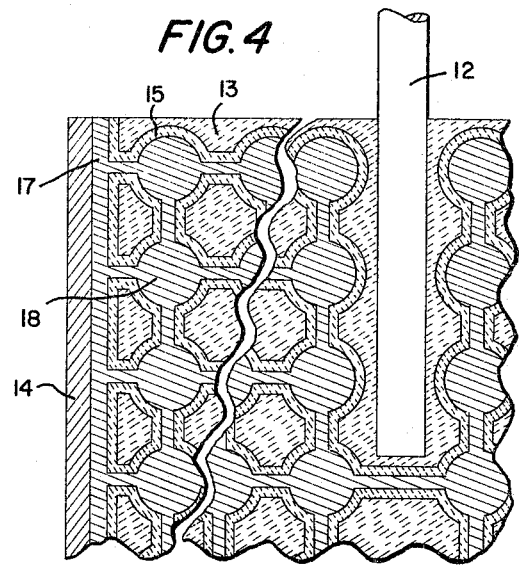
FIG. 4 is a schematic view, on a greatly enlarged scale, of a part of the capacitor of FIG. 3.

A detail of FIG. 3 is shown schematically in FIG. 4 on an enlarged scale.

The porous semiconductive material has numerous bubbles 18 like a sponge. Each bubble, which is called "a cell" has a wall with a certain area. In the present embodiment, the wall surface is treated according to the above described compensation method, and then, conductive material 17 such as silver paint is impregnated to form an electrode which covers and connects the wall surfaces. The semiconducting barium titanate body forms the opposing electrode as shown schematically in FIG. 4, when the wall surface of each cell is compensated in valence, there is formed a thin dielectric film 15. A capacity of 50 microfarads can be achieved with a porous semiconducting barium titanate block of 1 cm.$^3$ treated according to the present invention.

I claim:

1. A capacitor, comprising a body of controlled valence n-type metallic oxide semiconductor of the general formula $$E^{2+}M^{4+}O_3{}^{2-}$$

where E is an alkaline earth material taken from the group consisting of barium, magnesium, calcium, strontium and lead, and mixtures thereof, M is a metal material taken from the group consisting of titanium, tin, and zirconium, and mixtures thereof, and O is oxygen, one of the positive valence elements of said semiconductor being a host element and having therein a valence controlling additive material which when the alkaline earth material E is the host element is taken from the group consisting of yttrium, actinium, thorium, antimony and bismuth, the rare earth elements, and mixtures thereof, and which when the metal material M is the host element is taken from the group consisting of vanadium, niobium, antimony, tantalum, bismuth, selenium, tellurium, tungsten, and mixtures thereof, for making said semiconductor semiconductive, said additive material being present in an amount of $x$ atomic percent of the host element, $x$ having a value of from 0.01 to 0.5, at least one surface layer of said body having therein $x$ atomic percent of a compensating material which when the alkaline earth material E is the host element therefor is taken from the group consisting of sodium, potassium, copper, rubidium, silver, cesium, gold, and mixtures thereof, and which when the metal material M is the host element therefor is taken from the group consisting of aluminum, scandium, chromium, molybdenum, manganese, iron, cobalt, nickel, magnesium, and mixtures thereof, which compensating material makes the surface layer highly resistive by compensating the semiconductive effect of said additive material, and an electrode on said one surface layer and a further electrode on a surface layer of said body which is spaced from said one surface layer.

2. A capacitor, comprising a body of controlled valence n-type metallic oxide semiconductor of the general formula $$E_{1-x}^{2+}A_x^{a+}M_{1-(a-2)x}^{4+}M_{(a-2)x}^{3+}O_3^{2-}$$

where E is an alkaline earth material taken from the group consisting of barium, magnesium, calcium, strontium and lead, and mixtures thereof, M (each occurrence) is a metal material taken from the group consisting of titanium, tin, and zirconium, and mixtures thereof, A is a material having a valence $a$ greater than 2 and an ionic radius close to that of the alkaline earth material E, and is taken from the group consisting of yttrium, actinium, thorium, antimony, bismuth, the members of rare earth elements, and mixtures thereof, and the material A being present in an amount of $x$ atomic percent of element E and $x$ lies between 0.01 and 0.5, and O is oxygen, at least one surface layer of said body being a highly dielectric material having a composition of the general formula $$E_{1-(a-1)x}^{2+}A_x^{a+}C_{(a-2)x}^{1+}M^{4+}O_3^{2-}$$

where E, A, M and O are the same materials as in the first mentioned general formula and C is a material having a valence lower than the valence of the alkaline earth material E and is a material taken from the group consisting of sodium, potassium, copper, rubidium, silver, cesium, gold, and mixtures thereof, and an electrode on said one surface layer and a further electrode on a surface layer of said body which is spaced from said one surface layer.

3. A capacitor, comprising a body of controlled valence n-type metallic oxide semiconductor of the general formula $$E^{2+}M_{1-(b-3)x}^{4+}M_{(b-4)}^{3+}B_x^{b+}O_3^{2-}$$

where E is an alkaline earth material taken from the group consisting of barium, magnesium, calcium, strontium and lead,, and mixtures thereof, M (each occurrence) is a metal material taken from the group consisting of titanium, tin, and zirconium, and mixtures thereof, B is a material having a valence $b$ greater than 4 and an ionic radius close to that of the metal M, and is taken from the group consisting of vanadium, niobium, antimony, tantalum, bismuth, selenium, tellurium, tungsten, and mixtures thereof, and the material B being present in an amount of $x$ atomic percent of element M and $x$ lies between 0.01 and 0.5, and O is oxygen, at least one surface layer of said body being a highly dielectric material having a composition of the general formula $$E_{1-(b-4)x}^{2+}C_{(b-4)x}^{1+}M_{1-x}^{4+}B_x^{b+}O_3^{2-}$$

where E, M, B and O are the same materials as in the first-mentioned general formula and C is a material having a valence lower than the valence of the alkaline earth material E and is a material taken from the group consisting of sodium, potassium, copper, rubidium, silver, cesium, gold, and mixtures thereof, and an electrode on said one surface layer and a further electrode on a surface layer of said body which is spaced from said one surface layer.

4. A capacitor, comprising a body of controlled valence n-type metallic oxide semiconductor of the general formula $$E_{1-x}^{2+}A_x^{a+}M_{1-(a-2)x}^{4+}M_{(a-2)x}^{3+}O_3^{2-}$$

where E is an alkaline earth material taken from the group consisting of barium, magnesium, calcium, strontium and lead, and mixtures thereof, M (each occurrence) is a metal material taken from the group consisting of titanium, tin, and zirconium, and mixtures thereof, A is a material having a valence $a$ greater than 2 and an ionic radius close to that of the alkaline earth material E, and is taken from the group consisting of yttrium, actinium, thorium, antimony, bismuth, the members of rare earth elements, and mixtures thereof, and the material A being present in an amount of $x$ atomic percent of element E and $x$ lies between 0.01 and 0.5, and O is oxygen, at least one surface layer of said body being a highly dielectric material having a composition of the general formula $$E_{1-x}^{2+}A_x^{a}M_{1-(a-2)x/(4-d)}^{4+}D_{(a-2)x/(4-d)}^{d+}O_3^{2-}$$

where E, A, M and O are the same materials as in the first-mentioned general formula and D is a material having a valence $d$ lower than the valence of the metal material M and is a material taken from the group consisting of aluminum, scandium, chromium, molybdenum, manganese, iron, cobalt, nickel, magnesium, and mixtures thereof, and an electrode on said one surface layer and a further electrode on a surface layer of said body which is spaced from said one surface layer.

5. A capacitor, comprising a body of controlled valence n-type metallic oxide semiconductor of the general formula $$E^{2+}M_{1-(b-3)x}^{4+} M_{(b-4)x}^{3+} B_x^{b+} O_3^{2-}$$

where E is an alkaline earth material taken from the group consisting of barium, magnesium, calcium, strontium and lead, and mixtures thereof, M is a metal material taken from the group consisting of titanium, tin, and zirconium, and mixtures thereof, B is a material having a valence $b$ greater than 4 and an ionic radius close to that of the metal M, and is taken from the group consisting of vanadium, niobium, antimony, tantalum, bismuth, selenium, tellurium, tungsten, and mixtures thereof, and the material B being present in an amount of $x$ atomic percent of element M and $x$ lies between 0.01 and 0.5, and O is oxygen, at least one surface layer of said body being a highly dielectric material having a composition of the general formula $$E^{2+}M_{1-(b-d)x/(4-d)}^{4+} B_x^{b+} D_{(b-4)x/(4-d)}^{d+} O_3^{2-}$$

where E, M, B and O are the same materials as in the first-mentioned general formula and D is a material having a valence $d$ lower than the valence of the metal material M and is a material taken from the group consisting of aluminum, scandium, chromium, molybdenum, manganese, iron, cobalt, nickel, magnesium, and mixtures thereof, and an electrode on said one surface layer and a further electrode on a surface layer of said body which is spaced from said one surface layer.

No references cited.

JOHN W. HUCKERT, *Primary Examiner.*

J. D. KALLAM, *Assistant Examiner.*